(12) United States Patent
Godden

(10) Patent No.: US 7,421,387 B2
(45) Date of Patent: Sep. 2, 2008

(54) DYNAMIC N-BEST ALGORITHM TO REDUCE RECOGNITION ERRORS

(75) Inventor: Kurt S. Godden, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 729 days.

(21) Appl. No.: 10/847,719

(22) Filed: May 18, 2004

(65) Prior Publication Data

US 2005/0187768 A1     Aug. 25, 2005

Related U.S. Application Data

(63) Continuation-in-part of application No. 10/785,693, filed on Feb. 24, 2004.

(51) Int. Cl.
*G06F 15/00*   (2006.01)

(52) U.S. Cl. ................. 704/200; 704/247; 704/240

(58) Field of Classification Search ............. 704/254, 704/252, 231, 236, 255, 256, 251, 240, 200, 704/235, 270, 249
See application file for complete search history.

(56) References Cited

U.S. PATENT DOCUMENTS

| | | | |
|---|---|---|---|
| 5,241,619 A * | 8/1993 | Schwartz et al. | 704/200 |
| 5,712,957 A * | 1/1998 | Waibel et al. | 704/240 |
| 6,587,818 B2 | 7/2003 | Kanevsky et al. | 704/251 |
| 6,587,824 B1 | 7/2003 | Everhart et al. | 704/275 |
| 6,757,652 B1 * | 6/2004 | Lund et al. | 704/254 |
| 2002/0173955 A1 | 11/2002 | Reich | 704/231 |
| 2003/0125948 A1 | 7/2003 | Lyudovyk | 704/257 |
| 2003/0139924 A1 | 7/2003 | Balasuriya | 704/231 |

* cited by examiner

*Primary Examiner*—Huyen X. Vo

(57) ABSTRACT

A method for reducing recognition errors. The method includes receiving an N-best list associated with an input of a computer based recognition system. The N-best list includes one or more hypotheses and associated confidence values. The input is classified in response to the N-best list, resulting in a classification. A re-scoring algorithm that is tuned for the classification is selected. The re-scoring algorithm is applied to the N-best list to create a re-scored N-best list. A hypothesis for the value of the input is selected based on the re-scored N-best list.

22 Claims, 2 Drawing Sheets

DYNAMIC N-BEST ALGORITHM TO REDUCE RECOGNITION ERRORS

CROSS REFERENCE TO RELATED APPLICATIONS

This application is a continuation-in-part of U.S. patent application Ser. No. 10/785,693 filed on Feb. 24, 2004, which is herein incorporated by reference in its entirety.

BACKGROUND OF THE INVENTION

The present disclosure relates generally to a dynamic N-best algorithm to reduce recognition errors in computer based recognition systems and, in particular, to a method of dynamically re-scoring an N-best list created in response to a given input.

One type of computer based recognition system is a speech recognition system. Speech recognition is the process by which an acoustic signal received by microphone or telephone is converted to a set of text words, numbers, or symbols by a computer. Speech recognition systems model and classify acoustic symbols to form acoustic models, which are representations of basic linguistic units referred to as phonemes. Upon receiving and digitizing an acoustic speech signal, the speech recognition system analyzes the digitized speech signal, identifies a series of acoustic models within the speech signal, and derives a list of potential word candidates corresponding to the identified series of acoustic models. Notably, the speech recognition system can determine a measurement reflecting the degree to which the potential word candidates phonetically match the digitized speech signal. Speech recognition systems return hypotheses about the user's utterance in the form of an N-best list that consists of utterance hypotheses paired with numeric confidence values representing the recognition engine's assessment of the correctness of each hypothesis.

Speech recognition systems are utilized to analyze the potential word candidates with reference to a contextual model. This analysis determines a probability that one of the word candidates accurately reflects received speech based upon previously recognized words. The speech recognition system factors subsequently received words into the probability determination as well. The contextual model, often referred to as a language model, can be developed through an analysis of many hours of human speech or, alternatively, a written corpus that reflects speaking patterns. Typically, the development of the language model is domain specific. For example, a language model may be built reflecting language usage within an automotive context, a medical context, or for a general user.

Post-recognition N-best processing algorithms that reorder N-best candidates created by a speech recognition system are sometimes used in production speech understanding applications to improve upon the accuracy obtained by always using the top candidate returned on the N-best list. Previous research into N-best processing algorithms has generally emphasized the use of domain knowledge encoded in the language models. For example, knowledge sources such as syntactic and semantic information encoded in the language models have been utilized as well as confidence values and class N-gram scores computed from valid utterances.

The accuracy of a speech recognition system is dependent on a number of factors. One such factor is the context of a user spoken utterance. In some situations, for example where the user is asked to spell a word, phrase, number, or an alphanumeric string, little contextual information is available to aid in the recognition process. In these situations, the recognition of individual letters or numbers, as opposed to words, can be particularly difficult because of the reduced contextual references available to the speech recognition system. This can be particularly acute in a spelling context, such as where a user provides the spelling of a name. In other situations, such as a user specifying a password, the characters can be part of a completely random alphanumeric string. In that case, a contextual analysis of previously recognized characters offers little, if any, insight as to subsequent user speech.

Recognizing the names of the letters of the alphabet is known to be difficult for speech systems, yet it is also very important in speech systems where spelling is needed (e.g., to capture new names of entities such as persons or place names). In current speech systems that are not tuned to any particular user's voice, the only way to reliably capture letter names is to use proxies for the letter names (e.g., "alpha" represents "a", "bravo represent "b", and so forth). The longer phonetic value of the proxies make them easier to distinguish from one another. The drawback for commercial systems is that the user cannot be reasonably expected to memorize some arbitrary list of proxies. Spelling is a desired feature in speech systems because the larger problem of arbitrary entity name recognition such as person or place names is even more difficult.

Other computer based recognition systems face similar issues when attempting to increase recognition accuracy. It is desirable to increase recognition accuracy without requiring the user to provide input to the computer based recognition engine via particular languages or symbols defined for the specific computer based recognition system.

BRIEF DESCRIPTION OF THE INVENTION

One aspect of the invention is a method for reducing recognition errors. The method includes receiving an N-best list associated with an input of a computer based recognition system. The N-best list includes one or more hypotheses and associated confidence values. The input is classified in response to the N-best list, resulting in a classification. A re-scoring algorithm that is tuned for the classification is selected. The re-scoring algorithm is applied to the N-best list to create a re-scored N-best list. A hypothesis for the value of the input is selected based on the re-scored N-best list.

In another aspect, a computer program product for reducing recognition errors includes a storage medium readable by a processing circuit and storing instructions for execution by the processing circuit for performing a method that includes receiving an N-best list associated with an input of a computer based recognition system. The N-best list includes one or more hypotheses and associated confidence values. The input is classified in response to the N-best list, resulting in a classification. A re-scoring algorithm that is tuned for the classification is selected. The re-scoring algorithm is applied to the N-best list to create a re-scored N-best list. A hypothesis for the value of the input is selected based on the re-scored N-best list.

In a further aspect, a system for reducing recognition errors includes a host system in communication with a computer based recognition system. The host system includes instructions to implement a method including receiving an N-best list associated with an input of the computer based recognition system. The N-best list includes one or more hypotheses and associated confidence values. The input is classified in response to the N-best list, resulting in a classification. A re-scoring algorithm that is tuned for the classification is selected. The re-scoring algorithm is applied to the N-best list to create a re-scored N-best list. A hypothesis for the value of the input is selected based on the re-scored N-best list.

BRIEF DESCRIPTION OF THE DRAWINGS

Referring to the exemplary drawings wherein like elements are numbered alike in the several FIGURES.

DETAILED DESCRIPTION OF THE INVENTION

Figure 1:
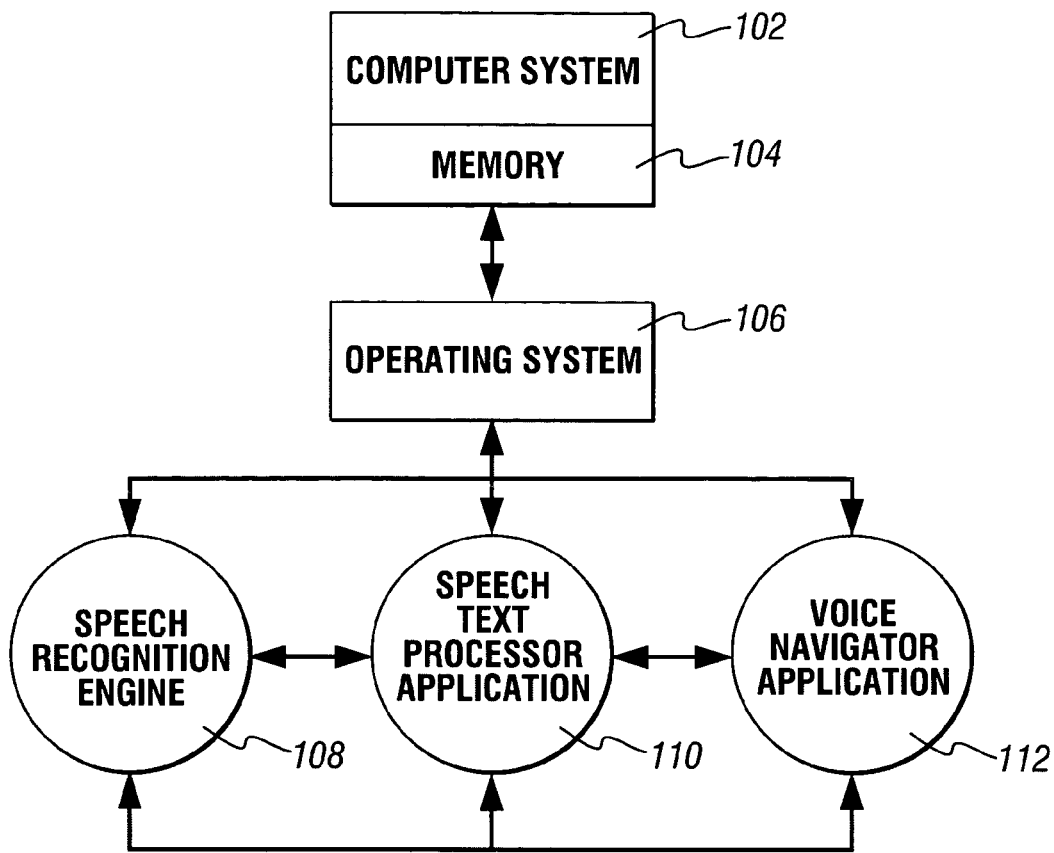
FIG. 1 is a schematic diagram illustrating a typical architecture for a speech recognition system that may be utilized to provide a dynamic N-best algorithm to reduce speech recognition errors.

A method for reducing the rate of errors produced by a recognition engine is presented. This method is applicable to any recognition engine that produces N-best lists with associated confidence values. Examples include systems such as: speech recognition systems, optical character recognition systems, image recognition systems, handwriting recognition systems and fingerprint recognition systems. One such recognition engine, a speech recognition system, returns hypotheses about the user's utterance in the form of an N-best list that consists of utterance hypotheses paired with numeric confidence values representing the recognition engine's assessment of the correctness of each hypothesis. Default system behavior is to select the hypothesis with the highest confidence value as the representation of the user's utterance. A misrecognition occurs when the user's actual utterance is other than this default selection (i.e., the hypothesis is not at the top of the N-best list). A variety of N-best processing algorithms have been devised in the literature to try and reduce these misrecognition error rates by re-scoring the system-generated confidence values, generally using domain-specific information external to the N-best list, such as syntactic and semantic understanding of the user's utterance with respect to the domain. An exemplary embodiment of the present invention re-scores the hypotheses on the N-best list in a two-step process. First, it uses the N-best list to classify the input (e.g., user utterance) in order to select a re-scoring algorithm that is tuned for a particular hypothesis. Second, rather than referring to domain-specific information, the selected algorithm refers only to statistical properties of the confidence values that appear on the N-best list to re-score the N-best list. These statistical properties have been pre-computed from a training set of utterances and corresponding N-best lists.

A typical computer system, or host system, is used in conjunction with exemplary embodiments of the present invention. The system may include a computer having a central processing unit (CPU), one or more memory devices, and associated circuitry. The memory devices may be comprised of an electronic random access memory and a bulk data storage medium for storing the training data and the data utilized to dynamically select the best performing re-scoring algorithm. The system may also include a microphone operatively connected to the computer system through suitable interface circuitry and an optional user interface display unit such as a video data terminal operatively connected thereto. The CPU may be comprised of any suitable microprocessor or other electronic processing known in the art. Speakers, as well as interface devices, such as a mouse and a keyboard, can be provided by the system, but are not necessary for operation of the invention as described herein. The various hardware requirements for the computer system as described herein generally can be satisfied by any one of many commercially available high-speed computers.

FIG. 1 is a schematic diagram illustrating a typical architecture for a speech recognition system in a computer 102 such as the previously described computer system. As shown in FIG. 1, within the memory 104 of computer system 102 is an operating system 106 and a speech recognition engine 108. Also included is a speech text processor application 110 and a voice navigator application 112. The invention, however, is not limited in this regard and the speech recognition engine 108 can be used with any other application program which is to be voice enabled.

In FIG. 1, the speech recognition engine 108, speech text processor application 110, and the voice navigator application 112 are shown as separate application programs. It should be noted, however, that the invention is not limited in this regard, and that these various application programs can be implemented as a single, more complex application program. For example, the speech recognition engine 108 may be combined with the speech text processor application 110 or with any other application to be used in conjunction with the speech recognition engine 108. Also, if no other speech controlled application programs are to be operated in conjunction with the speech text processor application 110 and speech recognition engine 108, the system can be modified to operate without the voice navigator application 112. The voice navigator application 112 primarily helps coordinate the operation of the speech recognition engine 108.

In operation, audio signals representative of sound received through a microphone are processed within computer 102 using conventional computer audio circuitry so as to be made available to the operating system 106 in digitized form. Alternatively, audio signals are received via a computer communications network from another computer system in analog or digital format or from another transducive device such as a telephone. The audio signals received by the computer system 102 are conventionally provided to the speech recognition engine 108 via the computer operating system 106 in order to perform speech recognition functions. As in conventional speech recognition systems, the audio signals are processed by the speech recognition engine to identify words and/or phrases spoken by a user into the microphone.

As is known in the art, the speech recognition engine 108, in response to an utterance, returns an N-best list of hypotheses paired with confidence values (CVs) which represents the best guess of the speech recognition engine 108 regarding the correctness of each hypothesis on the N-best list. The default for typical speech recognition applications is to select the hypothesis with the highest CV and assume that it is the correct utterance. This behavior will result in misrecognition in cases where the highest CV is not associated with the correct utterance.

An exemplary embodiment of the present invention dynamically selects from combinations of six algorithms to re-score the hypotheses on the N-best list. The algorithms are domain independent methods that utilize information that is present solely in the N-best list and require legacy data in domain for training and parameter estimation. The first algorithm utilizes the confidence values in the N-best list to determine the value of the utterance and selects the hypothesis in the N-best list with the highest value. This may result in a high overall accuracy rate but may also result in a low accuracy rate for particular or individual utterances. This becomes particularly troublesome when the low accuracy rate values are associated with commonly used utterances (e.g., in a spelling application the letter "e" is often confused with a "b" and is the most common letter in the English alphabet). The second algorithm, referred to as the prior probabilities algorithm, takes into account the expected frequency of particular values in a given utterance. These percentages are computed by analyzing large collections of text (e.g., an on-line library).

The third algorithm utilized by exemplary embodiments of the present invention takes into account the values on the N-best list returned by the speech recognition engine 108. This conditional probability re-scoring algorithm examines the "signatures" created based on the training data for two or more utterances that are included on the N-best list returned by the speech recognition engine 108. For example, based on the training data, the signature for the utterance "m" may include an N-best list that contains the letter "m" 100% of the time, "1" 65% of the time, "n" 100% of the time and "f" 25% of the time. In contrast, the signature for the utterance "n" may include an N-best list that contains the letter "m" 100% of the time, "n" 100% of the time, "1" 97% of the time, "f" 50% of the time, and "s" 15% of the time. If the user says "m", then "f" will appear in the N-best list approximately 25% of the time, and "1" will appear 65% of the time. But, if the user instead says "n", then "f" is more likely to appear on the list (50% instead of 25%), and "s" will now start to show up 15% of the time. So, for a new utterance to be recognized if the N-best list includes not only "m", n" and "1" but also "f" and "s", then it is more likely that the user said "n."

The fourth algorithm analyzes the confidence value distributions associated with each candidate on the N-best list. For an unknown utterance, "u", each candidate on the N-best list is considered as the hypothesized utterance. For each such hypothesis, the CV of every candidate on the N-best list is compared to the distributions for those candidates, given the uttered hypothesis. Those CVs that are closer to the mean for a particular distribution provide stronger evidence for the hypothesis under consideration, compared to the same CVs that are further from the expected means for other hypotheses. For example, assuming the mean CVs as shown below:

| Utterance | Mean CV for "m" | Mean CV for "n" |
|---|---|---|
| "m" | 0.71 | 0.43 |
| "n" | 0.76 | 0.57 |

The above chart shows the expected mean values for the CVs for two different utterances in the domain of a spelling application. The first row shows that if the user actually says "m" that the expected mean for the CV associated with "m" on the N-best list is 0.71 and the expected mean CV for "n" on the N-best list is 0.43. Similarly, the second row shows that if the user actually says "n", then the expected means are 0.76 and 0.57. So, when the algorithm is looking at a new N-best list and trying to figure out what the user said, it looks at the CVs for these two hypotheses and determines which pair (0.71 and 0.43, or 0.76 and 0.57) is a better fit for the CVs that actually occur.

Now, assume two utterances occur as follows:

| Utterance 1 | | Utterance 2 | |
|---|---|---|---|
| Hypothesis | CV | Hypothesis | CV |
| "m" | 0.70999 | "m" | 0.77999 |
| "n" | 0.40999 | "n" | 0.73000 |

The speech recognition engine 108 determines (by default) that the user said "m" in both utterances, since the "m" hypothesis has the higher CV in both cases. However, in reality, one of these two utterances was an "n". This can be determined by seeing that in Utterance 1, the 0.709 is very close to 0.71 and also that 0.409 is very close to the 0.43 value. So, the "m" hypothesis is a better fit than "n", because if the user actually said "n", then the CVs of 0.709 and 0.409 are quite far from the expected 0.76 and 0.57. So, the first utterance really is an "m" and the default result is correct. Not so for the second utterance. The actual CVs of 0.77 and 0.73 are closer to the 0.76 and 0.57 values of the "n" row than to the 0.71 and 0.43 of the "m" hypothesis. In this case, the algorithm would override the default value of "m" and claim (correctly) that the user really said "n", even though it has a lower CV in this particular N-best list.

The fifth algorithm utilized by exemplary embodiments of the present invention utilizes knowledge about the length of the N-best lists. Some utterances typically result in very short lists (e.g., "o" and "w" for the letter name domain) while others typically produce long N-best lists (e.g., "b" and "e" for the letter name domain). Thus, the expected lengths of N-best lists are computed from a set of training data and the normal probability distribution functions utilized for lists of unknown utterances.

The sixth algorithm ignores the CVs of the N-best list candidates and examines the ordering of the candidate hypotheses on the N-best list. For example, an unknown utterance may result in a N-best list including the letters "b", "e", "v", "d", "p", and "t". The following table represents the bigrams in the N-best list returned by the search recognition engine 108 along with the probability of the ordering of each bigram if the utterance was actually a "b" or an "e". In this table, the notation 't-' is used to indicate that 't' is the last hypothesis on the N-best list.

| Bigram | Probability if "b" | Probability if "e" |
|---|---|---|
| be | 0.005 | 0.20 |
| ev | 0.005 | 0.17 |
| vd | 0.560 | 0.24 |
| dp | 0.420 | 0.23 |
| pt | 0.310 | 0.40 |
| t- | 0.300 | 0.15 |

The column to the left depicts the six bigram sequences that are contained in the N-best list being considered. The first row in the middle column represents the probability (0.005), if the user actually said "b", that we'd expect the sequence of "b" followed by "e" to appear in the N-best list. In addition, it is expected that the sequence of "v" followed by "d" would appear 56% of the time and the sequence "dp" to appear 42% of the time and so on. But if the user said "e" instead of "b" these sequences are expected to appear with a different probability. The existence of the "be" sequence is stronger evidence for the "e" hypothesis than it is for the "b" hypothesis. The "dp" sequence is stronger evidence, however, for the "b" hypothesis. Each bigram sequence lends some weight in differing degrees to each of the hypotheses. By multiplying the columns of probabilities, the total evidence for each hypothesis can be determined for that hypothesis. For the data shown in the above table, the product of the probabilities if the utterance was "b" is 0.00000054684 which is less than 0.000112608, the product of the probabilities if the utterance was "e". This algorithm provides more support for the actual utterance being "e" and not "b", even though "b" appeared at the front of the N-best list with a higher CV.

Depending on the actual utterance, different combinations of one or more of these algorithms will result in the highest successful recognition rate for the speech recognition engine 108. For some user utterances, the application of just the sixth algorithm, the ordering of the candidate hypotheses on the N-best list gives the highest accuracy rate. For other user utterances, the results of applying the first algorithm (confidence values) multiplied by the result of applying the fourth algorithm (confidence value distributions) multiplied by the results of applying the sixth algorithm (ordering of candidate hypotheses) provides the highest accuracy rate. There are over sixty possible ways to combine the six algorithms described above into a re-scoring algorithm for application to the N-best lists. Depending on the actual utterance, different combinations will lead to different accuracy results. In most cases, it is possible to make a reasonably good prediction as to what the utterance is likely to be in order to select a good candidate re-scoring algorithm. Exemplary embodiments of the present invention dynamically select a re-scoring algorithm (made up of one or more of the previously discussed six algorithms) based upon a first guess at the value of the input utterance to be recognized.

Figure 2:
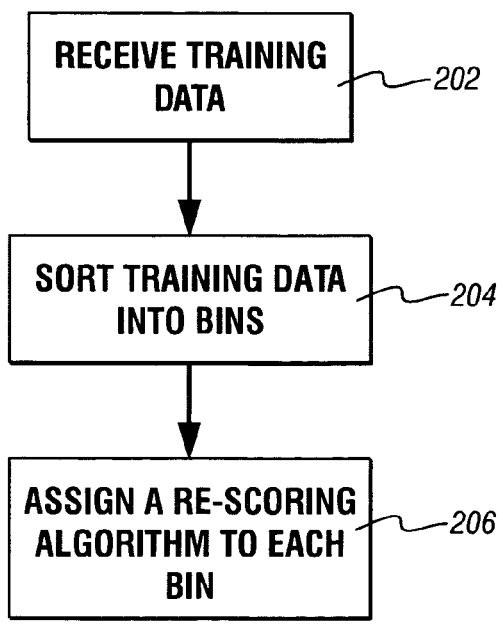
FIG. 2 is a flow diagram of an exemplary process for assigning bins and re-scoring algorithms to be utilized in providing a dynamic N-best algorithm to reduce speech recognition errors.

FIG. 2 is a flow diagram of an exemplary process for assigning bins and re-scoring algorithms to be utilized in providing a dynamic N-best algorithm to reduce speech recognition errors. At step 202, training data is received and at step 204 the training data is sorted into bins. Each bin contains those utterances that the speech recognition engine 108 determines to be the same based upon one of the six possible base algorithms previously discussed. For example, bin "f" would contain all the correctly recognized "f" utterances, as well as any other incorrectly recognized utterances of other letters that the speech recognition engine 108 determines to be an "f". This results in the bin containing both the utterances that the speech recognition engine 108 has correctly identified as the actual utterances spoken and those utterances that speech recognition engine 108 has incorrectly identified as being the utterances spoken. The best performing algorithm or combination of algorithms for each bin is determined. At step 206, the best performing re-scoring algorithm (which includes one or more of the previously described six algorithms) is assigned to each bin. In an exemplary embodiment of the present invention, the best performing re-scoring algorithm for each bin is determined based on testing the re-scoring algorithms on the training data.

Figure 3:
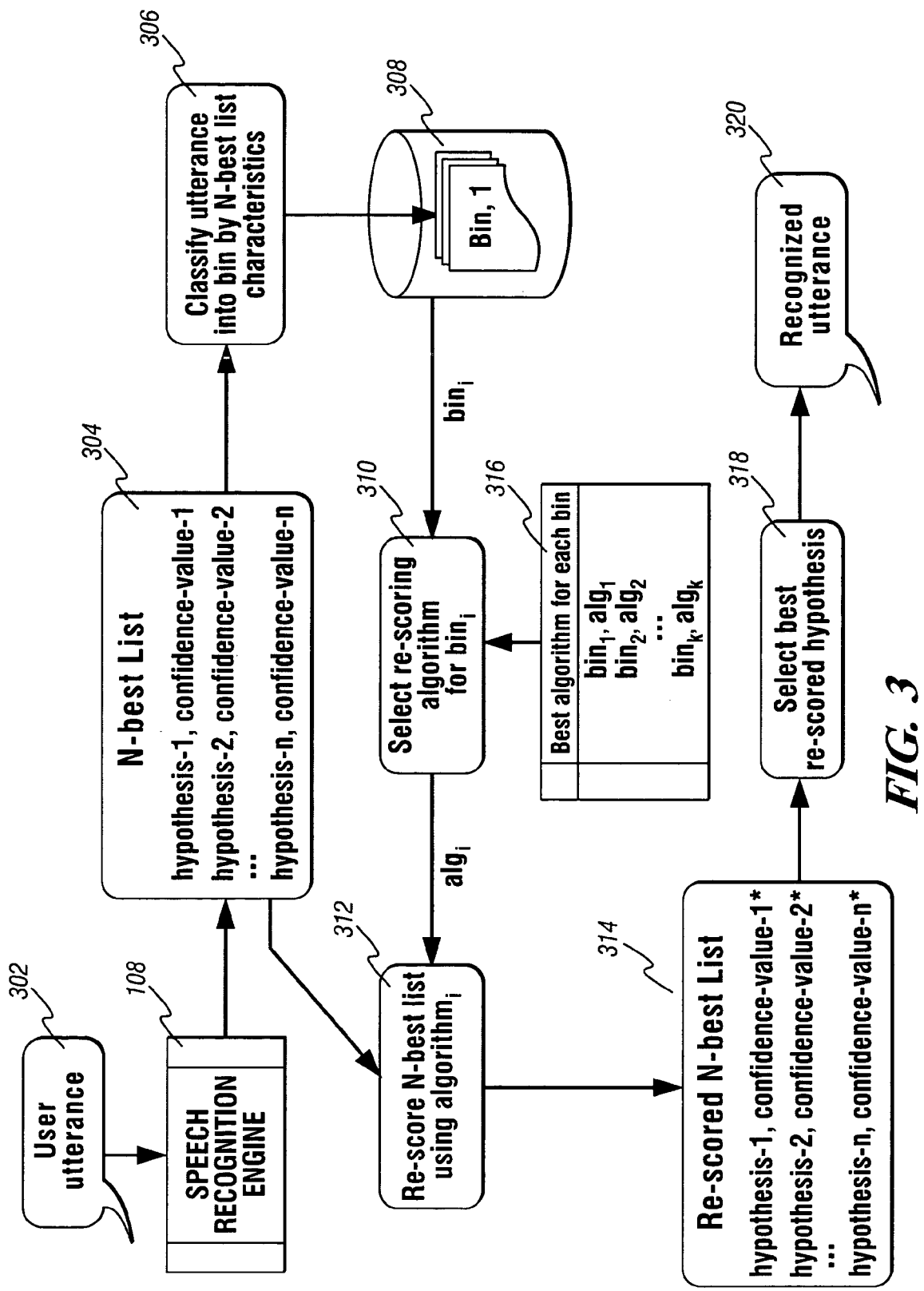
FIG. 3 is a block diagram of an exemplary process for providing a dynamic N-best algorithm to reduce speech recognition errors.

FIG. 3 is a block diagram of an exemplary process for providing a dynamic N-best algorithm to reduce speech recognition errors. A user utterance 302 is input to the speech recognition engine 108. In response to the user utterance 302, the speech recognition engine 108 produces an N-best list. The N-best list contains one or more hypotheses and associated CVs. At 306, the user utterance 302 is classified into a bin 308 based on the N-best list 304 characteristics. For example, the bin 308 may be selected based on the hypothesis in the N-best list with the highest CV. Alternatively, algorithm six or any of the six base algorithms may be used to sort the utterance into bin 308. At 310, the re-scoring algorithm, corresponding to the bin 308 is selected. As shown in box 316, each bin has an associated re-scoring algorithm as created at step 206 in FIG. 2. At 312, the N-best list is re-scored using the re-scoring algorithm selected at 310. At 318, the re-scored hypothesis with the highest score is selected from the re-scored N-best list 314. The recognized utterance 320 is output. In this manner, the most effective algorithm is dynamically selected and utilized to determine the value of the utterance.

The examples described above are based on a speech recognition engine 108 that recognizes names of letters in the alphabet. The same concepts applied to recognizing names of letters in the alphabet can be applied to recognizing names of numbers, words and/or phrases and/or sentences. Six algorithms that may singly, or in combination make up re-scoring algorithms are described herein. Any re-scoring algorithms known in the art may be utilized with exemplary embodiments of the present invention. Re-scoring algorithms may be chosen based on expected user utterances. For example, one set of re-scoring algorithms may be more effective at recognizing single letters of the alphabet and another set may be more effective at recognizing street map information. Additional re-scoring algorithms may be added and/or removed without departing from the spirit of the present invention.

Exemplary embodiments of the present invention utilize a dynamic N-best algorithm as a meta-algorithm to select the most appropriate re-scoring algorithm based on characteristics of the utterance data rather than external domain-dependent data. This may result in improved recognition performance and an increase in user satisfaction. The ability to select different re-scoring algorithms based on a best guess of the utterance value allows the re-scoring algorithms to be tailored based on an expected value. This can lead to an increase in overall accuracy when compared to using a single re-scoring algorithm for all utterance values.

An exemplary embodiment of the present invention has been described with reference to speech recognition systems, although the present invention is not limited to such. A wide variety of computer based recognition systems produce N-best lists with confidence values, such are known in the art. These recognizers include not only speech recognition but also optical character recognition, handwriting recognition, face recognition, diagram recognition, shape recognition, fingerprint recognition, and image recognition. Thus, exemplary embodiments of the present invention may be applied to all recognizers known in the art that produce N-best lists with numeric confidence scores associated with the N-best hypotheses.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for reducing recognition errors, the method comprising:
receiving an N-best list associated with an input of a computer based recognition system, the N-best list including one or more hypotheses and associated confidence values;
classifying the input in response to the N-best list to result in a classification into a bin from a plurality of bins according to characteristics of the N-best list;
selecting a re-scoring algorithm from a plurality of rescoring algorithms that are tuned for the classification, wherein the re-scoring algorithm is selected on a per bin basis;
applying the re-scoring algorithm to the N-best list to create a re-scored N-best list; and
selecting a hypothesis for the value of the input based on the re-scored N-best list.

2. The method of claim 1 wherein:
the computer based recognition system is a speech recognition engine;
the one or more hypotheses and associated confidence values are determined by the speech recognition engine; and
the input is a user utterance.

3. The method of claim 2 wherein the user utterance includes a name of a letter in the alphabet.

4. The method of claim 2 wherein the user utterance includes a name of a number.

5. The method of claim 2 wherein the user utterance includes a word.

6. The method of claim 2 wherein the user utterance includes a phrase.

7. The method of claim 2 wherein the user utterance includes a sentence.

8. The method of claim 1 wherein the computer based recognition system is an optical character reader engine.

9. The method of claim 1 wherein the computer based recognition system is an image recognition engine.

10. The method of claim 1 wherein the re-scoring algorithm was created in response to training data.

11. The method of claim 1 wherein the classifying is based on one or more of the confidence values associated with the one or more hypotheses on the N-best list, an expected frequency of the one or more hypotheses on the N-best list, a conditional probability that the one or more hypotheses are included in the N-best list, confidence value distributions associated with each of the one or more hypotheses, the number of hypotheses on the N-best list, and the order of the hypotheses on the N-best list, where the one or more hypotheses on the N-best list are ordered from highest associated confidence value to lowest associated confidence value.

12. The method of claim 1 wherein the selecting a hypothesis includes selecting the hypothesis with the highest confidence value from the one or more hypotheses on the re-scored N-best list.

13. The method of claim 1 wherein the re-scoring algorithm is based on statistical properties associated with the N-best list.

14. The method of claim 1 wherein the re-scoring algorithm includes re-scoring the N-best list based on the confidence values associated with the one or more hypotheses on the N-best list.

15. The method of claim 1 wherein the re-scoring algorithm includes re-scoring the N-best list based on an expected frequency of the one or more hypotheses on the N-best list.

16. The method of claim 1 wherein the re-scoring algorithm includes re-scoring the N-best list based on a conditional probability that the one or more hypotheses are included in the N-best list.

17. The method of claim 1 wherein the re-scoring algorithm includes re-scoring the N-best list based on confidence value distributions associated with each of the one or more hypotheses.

18. The method of claim 1 wherein the re-scoring algorithm includes re-scoring the N-best list based on the number of hypotheses on the N-best list.

19. The method of claim 1 wherein the re-scoring algorithm includes re-scoring the N-best list based on the order of the hypotheses on the N-best list, where the one or more hypotheses on the N-best list are ordered from highest associated confidence value to lowest associated confidence value.

20. The method of claim 1 wherein the re-scoring algorithm includes one or more of re-scoring the N-best list based on the confidence values associated with the one or more hypotheses on the N-best list, re-scoring the N-best list based on an expected frequency of the one or more hypotheses on the N-best list, re-scoring the N-best list based on a conditional probability that the one or more hypotheses are included in the N-best list, re-scoring the N-best list based on confidence value distributions associated with each of the one or more hypotheses, re-scoring the N-best list based on the number of hypotheses on the N-best list, and re-scoring the N-best list based on the order of the hypotheses on the N-best list, where the one or more hypotheses on the N-best list are ordered from highest associated confidence value to lowest associated confidence value.

21. A computer implemented method for providing a dynamic N-best algorithm to reduce recognition errors, the method comprising:
receiving an N-best list associated with an input of a computer based recognition system, the N-best list including one or more hypotheses and associated confidence values;
classifying the input in response to the N-best list to result in a classification into a bin from a plurality of bins according to characteristics of the N-best list;
selecting a re-scoring algorithm from a plurality of rescoring algorithms that are tuned for the classification, wherein the re-scoring algorithm is selected on a per bin basis;
applying the re-scoring algorithm to the N-best list to create a re-scored N-best list; and selecting a hypothesis for the value of the input based on the re-scored N-best list.

22. A system for reducing recognition errors, the system comprising a host system in communication with a computer based recognition system, the host system including instructions to implement a method comprising:

receiving an N-best list associated with an input to the computer based recognition system, the N-best list including one or more hypotheses and associated confidence values;

classifying the input in response to the N-best list to result in a classification into a bin from a plurality of bins according to characteristics of the N-best list;

selecting a re-scoring algorithm from a plurality of rescoring algorithms that are tuned for the classification, wherein the re-scoring algorithm is selected on a per bin basis;

applying the re-scoring algorithm to the N-best list to create a re-scored N-best list; and selecting a hypothesis for the value of the input based on the re-scored N-best list.

\* \* \* \* \*